United States Patent
Griffin

(10) Patent No.: US 8,532,721 B2
(45) Date of Patent: Sep. 10, 2013

(54) PORTABLE ELECTRONIC DEVICE HAVING SLIDING DISPLAY PROVIDING EVENT NOTIFICATION

(75) Inventor: Jason Tyler Griffin, Kitchener (CA)

(73) Assignee: Blackberry Limited, Waterloo (CA)

( * ) Notice: Subject to any disclaimer, the term of this patent is extended or adjusted under 35 U.S.C. 154(b) by 445 days.

(21) Appl. No.: 12/977,216

(22) Filed: Dec. 23, 2010

(65) Prior Publication Data

US 2012/0165072 A1  Jun. 28, 2012

(51) Int. Cl.
H04M 1/00 (2006.01)
H04M 9/00 (2006.01)
H04B 1/38 (2006.01)

(52) U.S. Cl.
USPC .................. 455/575.2; 455/566; 379/433.11; 379/433.12

(58) Field of Classification Search
USPC ............. 455/566, 575.4; 379/433.11, 433.12
See application file for complete search history.

(56) References Cited

U.S. PATENT DOCUMENTS

| | | | |
|---|---|---|---|
| 5,414,811 A | | 5/1995 | Parulski et al. |
| 5,710,576 A | * | 1/1998 | Nishiyama et al. ............ 345/169 |
| 6,175,353 B1 | * | 1/2001 | Hoeksma ...................... 345/102 |
| 6,243,595 B1 | | 6/2001 | Lee et al. |
| 6,332,084 B1 | | 12/2001 | Shaanan et al. |
| 6,850,226 B2 | | 2/2005 | Finke-Anlauff |
| 6,963,756 B2 | | 11/2005 | Lubowicki et al. |
| 7,388,578 B2 | | 6/2008 | Tao |
| 7,486,973 B2 | * | 2/2009 | Wee et al. .................. 455/575.1 |

(Continued)

FOREIGN PATENT DOCUMENTS

EP  1603311 A2  12/2005
EP  1858236 A1  11/2007

(Continued)

OTHER PUBLICATIONS

Extended European Search Report issued Jun. 21, 2011 for corresponding EP Patent Appln. No. 10196720.6.

(Continued)

Primary Examiner — Marisol Figueroa
(74) Attorney, Agent, or Firm — Ridout & Maybee LLP; Tim Clise

(57) ABSTRACT

A handheld electronic device comprises a housing having a keyboard support member on a front thereof and a base defining a cavity therebetween, wherein light generated within the cavity can be viewed from a front of the housing; a display assembly slidably mounted to the housing and comprising a display screen on a front face thereof, the display assembly being slidable between a retracted position and an extended position, wherein in the retracted position a lower portion of the display screen is received within the cavity underlying the keyboard support member and an upper portion of the display screen is viewable outside of the cavity, and in the extended position the lower portion and the upper portion of the display screen are viewable outside of the cavity, wherein the display screen is a light emitting diode display screen comprising a plurality of pixels that are selectively illuminatable to display an image; a processor configured to control operation of the display screen; and a position sensor for indicating to the processor when the display assembly is in the retracted position. When the position sensor indicates the display assembly is in the retracted position, and upon an occurrence of one or more predetermined events, the processor is configured to generate an event notification by illuminating pixels in the lower portion of the display screen.

20 Claims, 12 Drawing Sheets

(56) References Cited

U.S. PATENT DOCUMENTS

| | | |
|---|---|---|
| 7,580,736 B2 | 8/2009 | Ronkko et al. |
| 7,692,667 B2 | 4/2010 | Nguyen et al. |
| 2002/0006813 A1 | 1/2002 | Lubowicki et al. |
| 2004/0070558 A1 | 4/2004 | Cok et al. |
| 2004/0229662 A1 | 11/2004 | Chadha |
| 2005/0096082 A1 | 5/2005 | Chang |
| 2005/0233785 A1 | 10/2005 | Park et al. |
| 2007/0024576 A1 | 2/2007 | Hassan |
| 2007/0115255 A1 | 5/2007 | Pan |
| 2007/0177404 A1 | 8/2007 | Daniel et al. |
| 2007/0247798 A1 | 10/2007 | Scott, II |
| 2007/0285401 A1 | 12/2007 | Ohki et al. |
| 2007/0287504 A1 | 12/2007 | Lim et al. |
| 2008/0144265 A1 | 6/2008 | Aoki |
| 2008/0207273 A1 | 8/2008 | Huo |
| 2008/0226970 A1 | 9/2008 | Kim et al. |
| 2008/0268901 A1 | 10/2008 | Miramontes |
| 2009/0075692 A1 | 3/2009 | Park et al. |
| 2009/0154082 A1 | 6/2009 | Nurmi et al. |
| 2009/0156264 A1 | 6/2009 | Cho et al. |
| 2009/0195499 A1 | 8/2009 | Griffin |
| 2009/0231785 A1 | 9/2009 | Li et al. |

FOREIGN PATENT DOCUMENTS

| | | |
|---|---|---|
| EP | 1931118 A2 | 6/2008 |
| EP | 1944949 A1 | 7/2008 |
| GB | 2417851 A | 3/2006 |
| WO | 03030497 A2 | 4/2003 |
| WO | 2008074358 A1 | 6/2008 |
| WO | 2010044902 A1 | 4/2010 |

OTHER PUBLICATIONS

JP 20030298694 A—Abstract—Portable Electronic Device.

U.S. Appl. No. 12/858,528, filed Aug. 18, 2010.

* cited by examiner

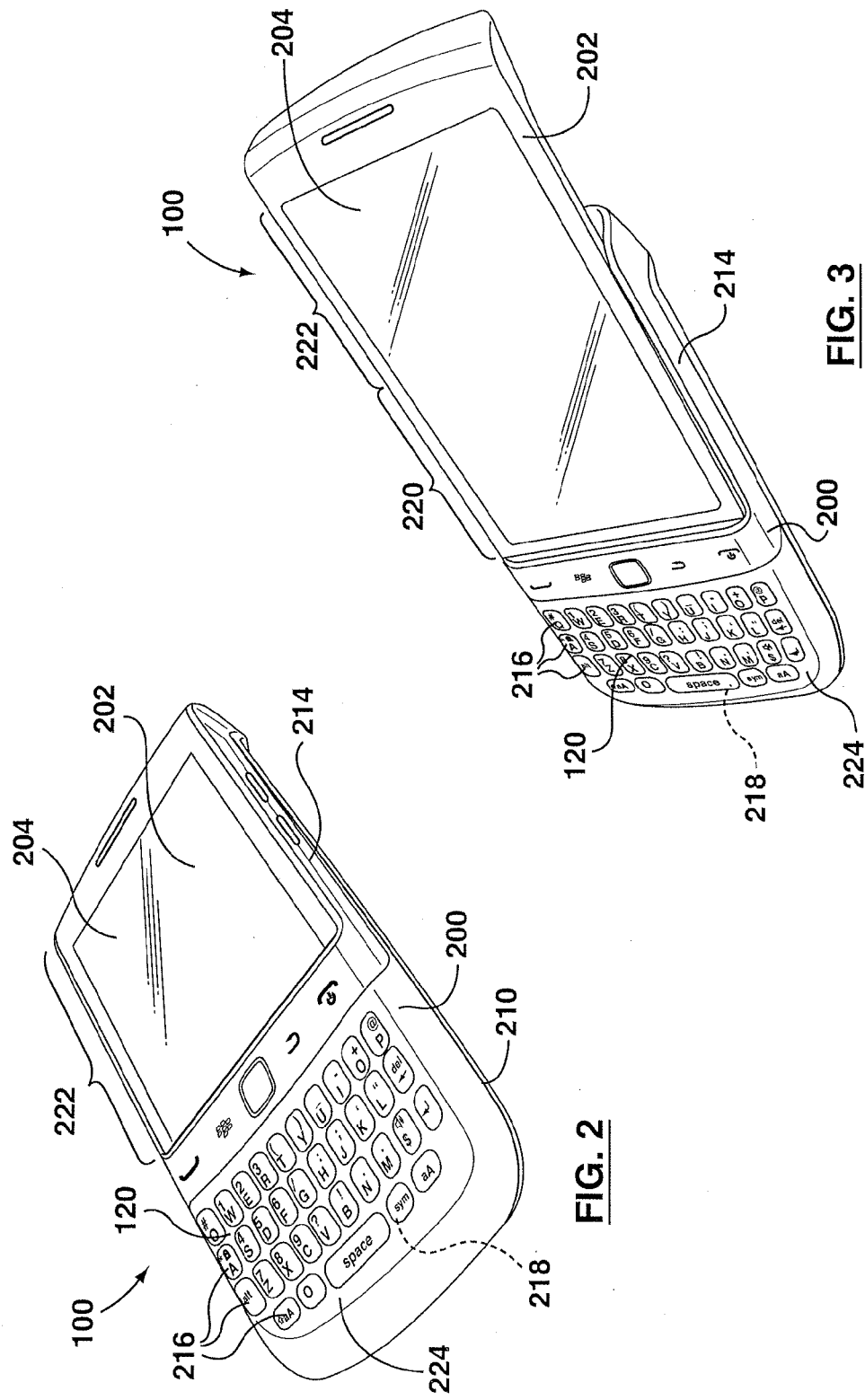

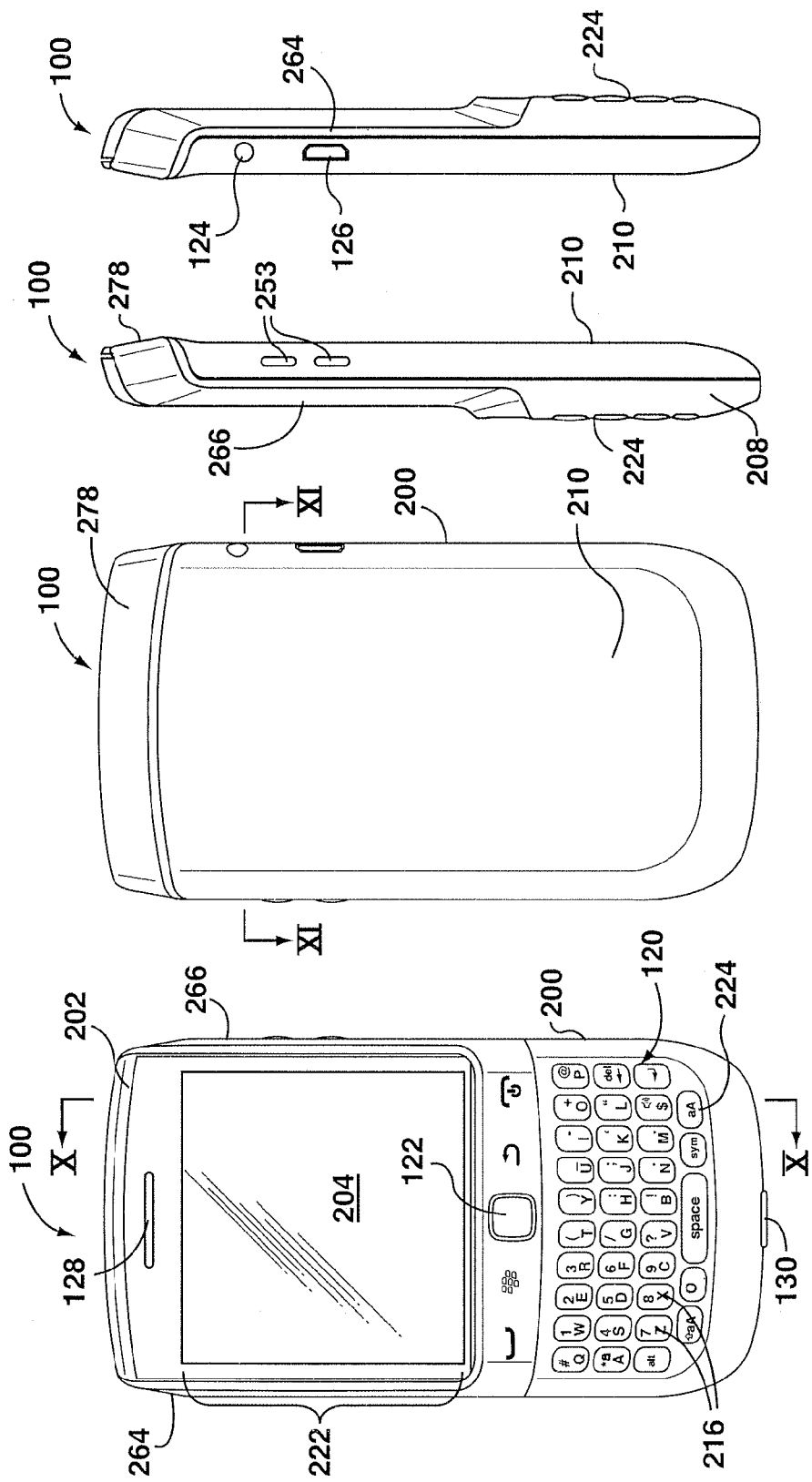

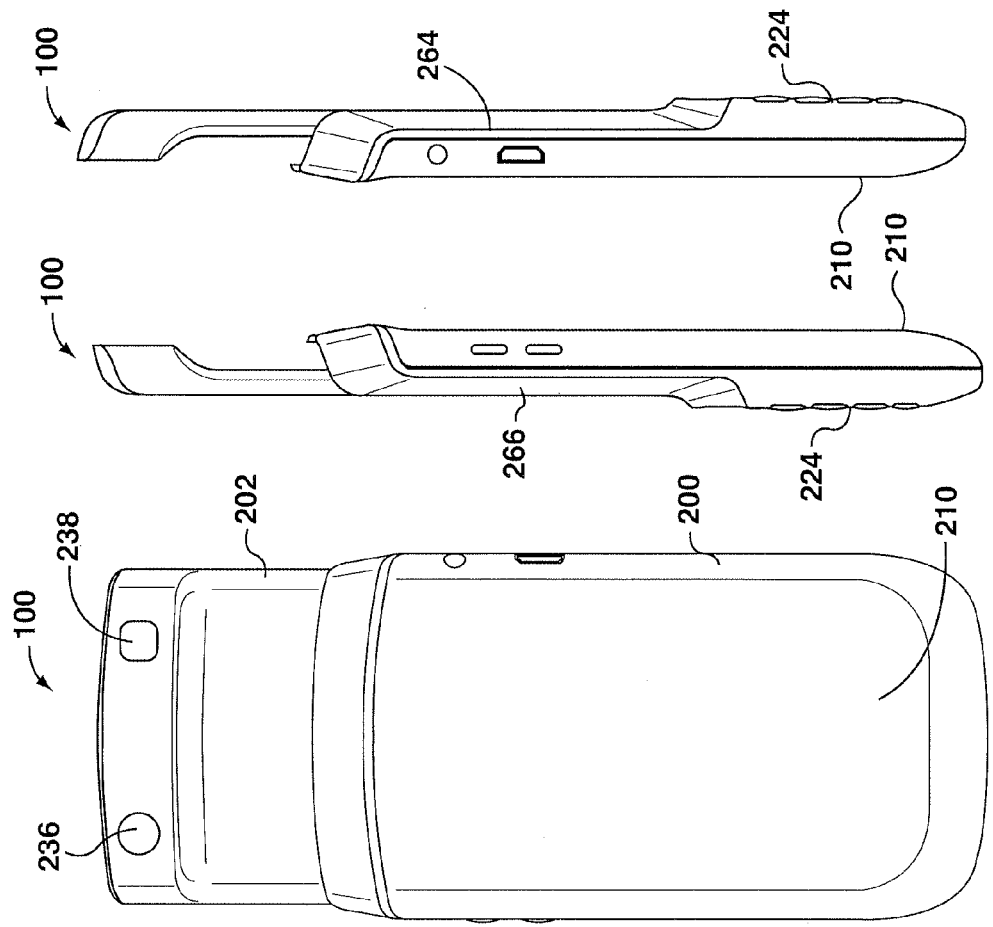

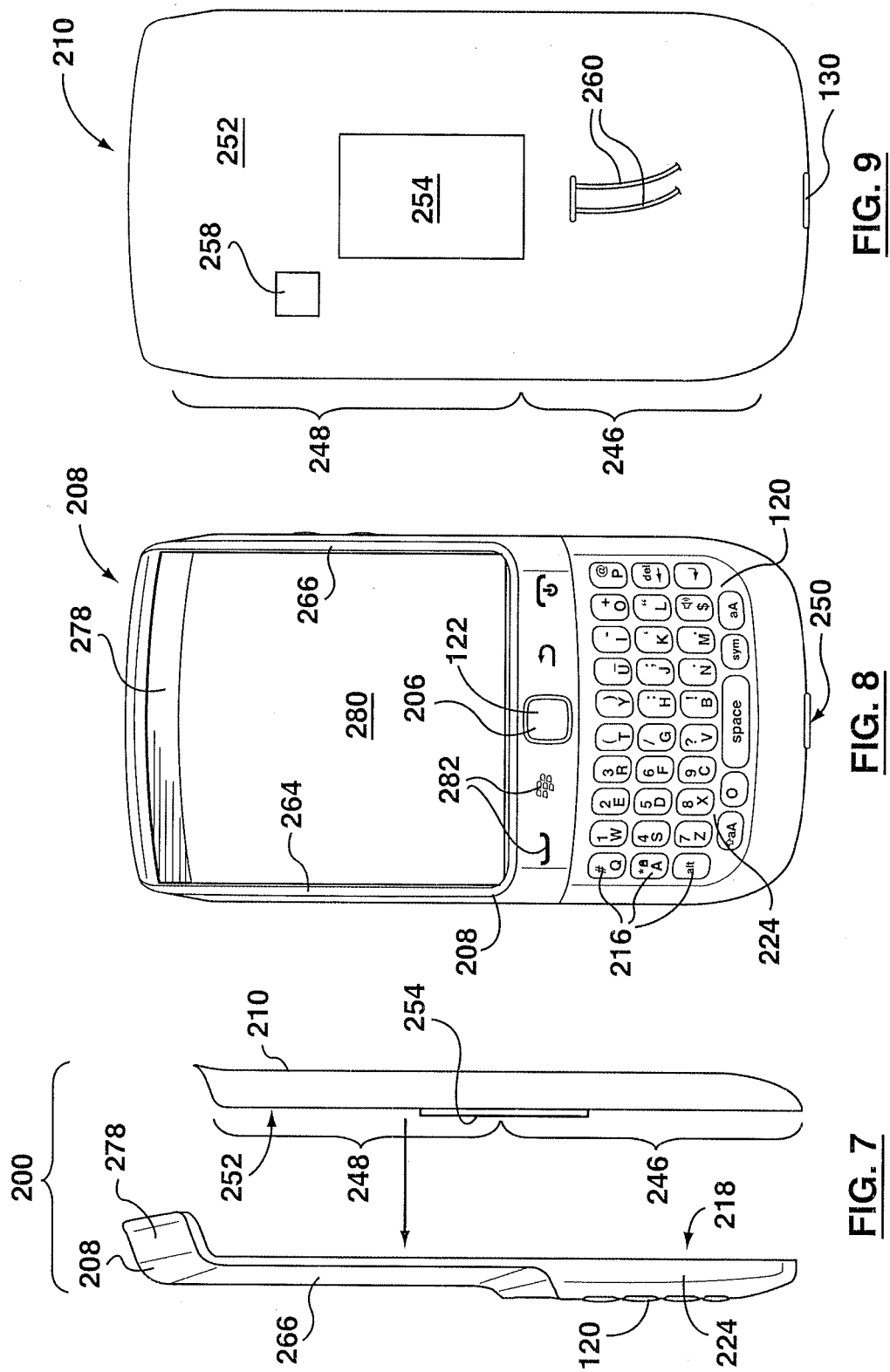

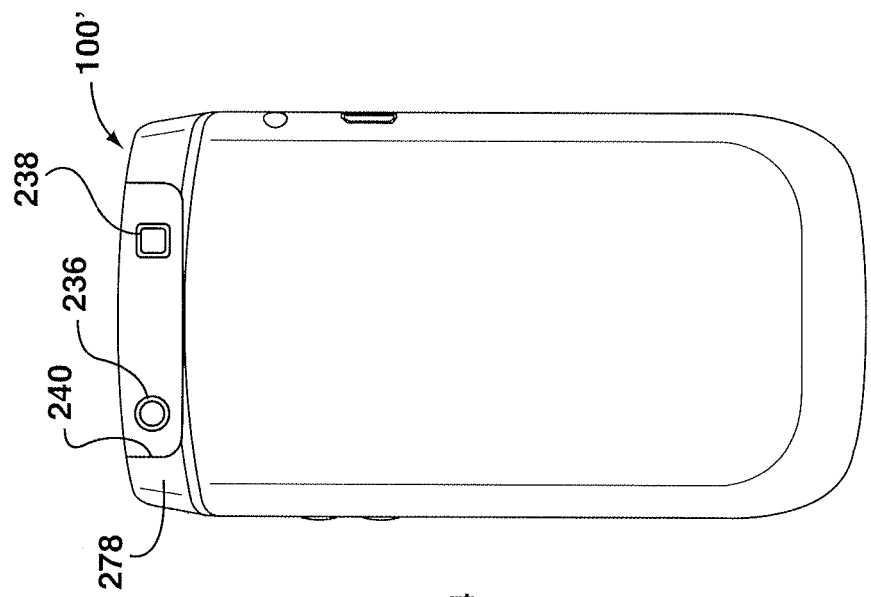
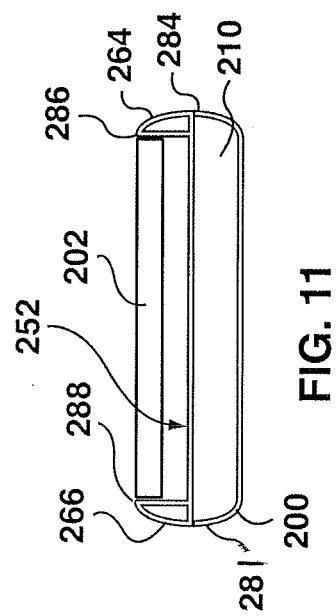
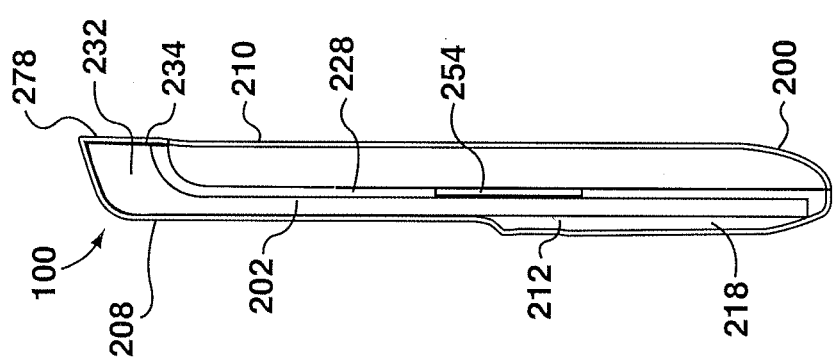
FIG. 12
FIG. 11
FIG. 10

PORTABLE ELECTRONIC DEVICE HAVING SLIDING DISPLAY PROVIDING EVENT NOTIFICATION

FIELD OF TECHNOLOGY

The present disclosure relates to electronic devices, including handheld electronic communication devices having a sliding display.

BACKGROUND

Electronic devices, including handheld electronic communication devices, have gained widespread use and may provide a variety of functions including, for example, telephonic, electronic text messaging, personal information manager (PIM) application functions, mobile web browsing, and audio and video playback, among other things.

In conjunction with these functions, electronic devices commonly include components such as light-emitting diodes to provide visual event notifications to a user. Alternate mechanisms for providing visual event notifications are desirable.

BRIEF DESCRIPTION OF THE DRAWINGS

Embodiments of the present disclosure will now be described, by way of example only, with reference to the attached Figures, wherein:

FIG. 2 is a perspective view of an example of a handheld electronic communication device including a display assembly in a retracted position;

FIG. 3 is a perspective view of the handheld electronic communication device of FIG. 2 showing the display assembly in an extended position;

FIG. 4A is a front view of the handheld electronic communication device of FIG. 2 showing the display assembly in the retracted position;

FIG. 4B is a back view of the handheld electronic communication device of FIG. 2 showing the display assembly in the retracted position;

FIG. 4C is a right side view of the handheld electronic communication device of FIG. 2 showing the display assembly in the retracted position;

FIG. 4D is a left side view of the handheld electronic communication device of FIG. 2 showing the display assembly in the retracted position;

FIG. 5A is a front view of the handheld electronic communication device of FIG. 2 showing the display assembly in the extended position;

FIG. 5B is a back view of the handheld electronic communication device of FIG. 2 showing the display assembly in the extended position;

FIG. 5C is a right side view of the handheld electronic communication device of FIG. 2 showing the display assembly in the extended position;

FIG. 5D is a left side view of the handheld electronic communication device of FIG. 2 showing the display assembly in the extended position;

FIG. 7 is an exploded side view of a housing of the handheld electronic communication device of FIG. 2;

FIG. 8 is a front view of a front housing member of the housing of FIG. 7;

FIG. 9 is a front view of a base of the housing of FIG. 7;

FIG. 10 is a schematic sectional view of the handheld electronic communication device of FIG. 2, taken along lines X-X of FIG. 4A;

FIG. 11 is a schematic sectional view of the handheld electronic communication device of FIG. 2, taken along lines XI-XI of FIG. 4B;

FIG. 12 is a back view of a further example of a handheld electronic communication device, showing the display assembly in the retracted position;

DETAILED DESCRIPTION

Figure 1:
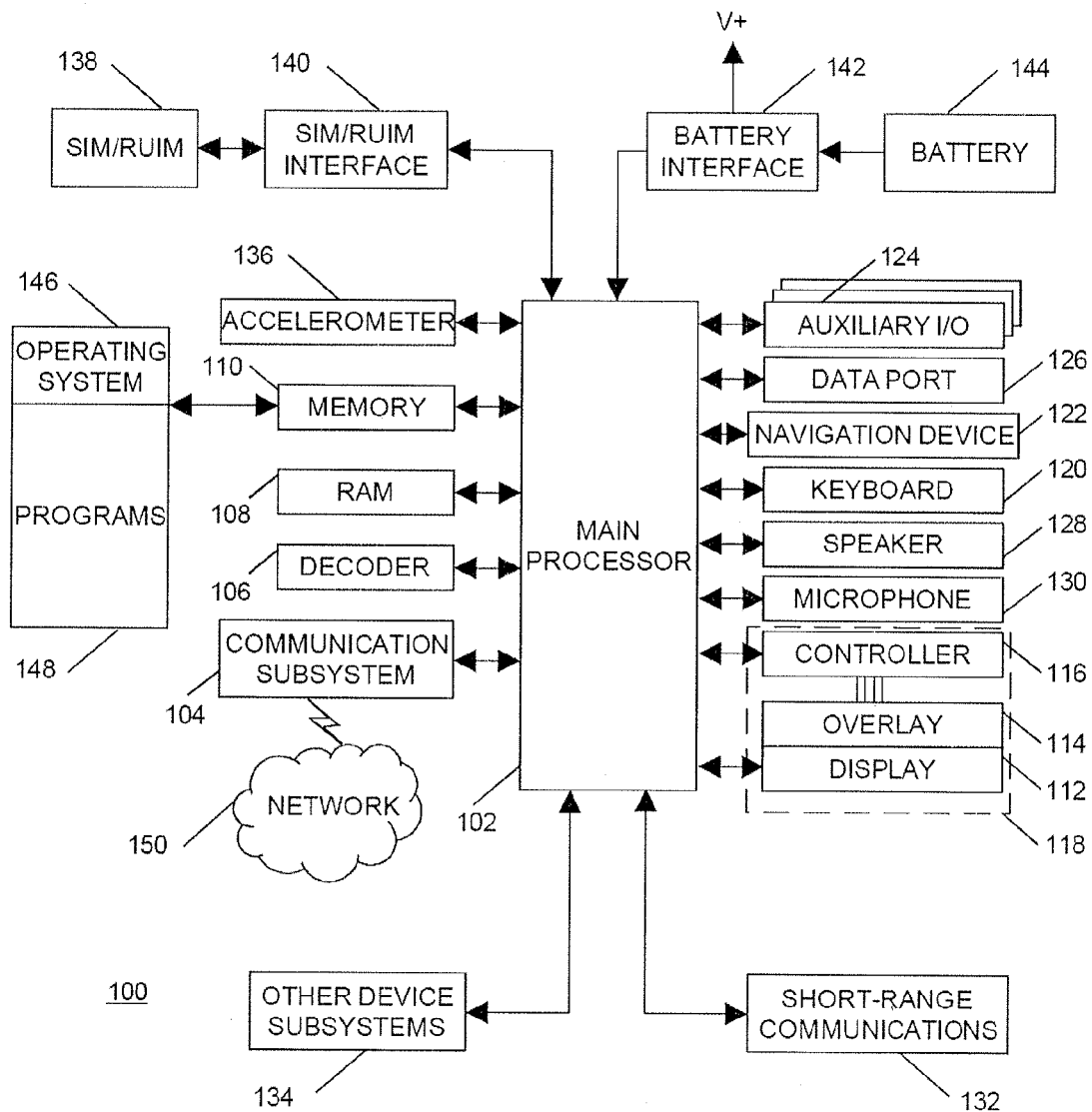
FIG. 1 is a simplified block diagram of components including internal components of a handheld electronic communication device according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

According to one example is a handheld electronic device including a housing comprising a keyboard support member on a front thereof and a base defining a cavity therebetween; a display assembly slidably mounted to the housing and comprising a display screen on a front face thereof, the display assembly being slidable between a retracted position and an extended position, wherein in the retracted position a lower portion of the display screen is received within the cavity underlying the keyboard support member and an upper portion of the display screen is viewable outside of the cavity, and in the extended position the lower portion and the upper portion of the display screen are viewable outside of the cavity, wherein the display screen is a light emitting diode display screen comprising a plurality of pixels that are selectively illuminatable to display an image and wherein the housing allows at least some light generated by illumination of the pixels in the lower portion to be viewed from a front of the housing when the lower portion is received within the cavity; a processor configured to control operation of the display screen; and a position sensor for indicating to the processor when the display assembly is in the retracted position. The processor is configured to, when the position sensor indicates the display assembly is in the retracted position, and upon an occurrence of one or more predetermined events, generate an event notification by illuminating pixels in the lower portion of the display screen.

According to another example is a method of generating event notifications on a handheld electronic device with a sliding display, the sliding display being slidable between a retracted position and an extended position, wherein in the retracted position a lower portion of the display is received within a cavity in the handheld electronic device and an upper portion of the display is viewable outside of the cavity, and in the extended position the lower portion and the upper portion of the display are viewable outside of the cavity. The method includes detecting an occurrence of one or more predetermined events; and when the display is in the retracted position, and upon detecting the occurrence of the one or more predetermined events, generating an event notification by illuminating pixels in the lower portion of the display.

Referring first to FIG. 1, a block diagram of components of the handheld electronic communication device 100 is shown. The handheld electronic communication device 100 includes multiple components such as a processor 102 that controls the operations of the handheld electronic communication device 100. Communication functions, including data and voice communications, are performed through a communication subsystem 104. Data received by the handheld electronic communication device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. In some examples, wireless network 150 is a conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. In some examples, wireless network 150 includes a wireless network which, in some embodiments, conforms to IEEE 802.11x standards (sometimes referred to as Wi-Fi) such as, for example, one or more of the IEEE 802.11a, 802.11b, 802.11g and 802.11n standards. Other communication protocols may be used for the network 150 include for example IEEE 802.20 (also referred to as Mobile Wireless Broadband Access). In some examples communication subsystem 104 could include two or more communications subsystems for communicating with two or more different types of wireless networks—for example a wireless wide area network communication subsystem for EDGE or GPRS communications and a wireless local area network communication subsystem for Wi-Fi communications. The handheld electronic communication device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an input device such as keyboard 120, an optional navigation device 122, an auxiliary input/output (I/O) subsystem 124, a data port 126, a speaker 128, a microphone 130, short-range communications 132 (which for example could include a Bluetooth™ interface or infrared interface, among other things) and other device subsystems 134. User-interaction with the graphical user interface may be performed through the touch-sensitive overlay 114. The processor 102 interacts with the touch-sensitive overlay 114 via the electronic controller 116. Information, such as text, characters, symbols, images, icons, and other features that may be displayed or rendered on a handheld electronic communication device, are displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces. Although the touch-sensitive display 118 is described as comprising a display 112 and an overlay 114, the touch-sensing components may overlay the display 112 or, alternatively, may be integrated into the display 112.

To identify a subscriber for network access according to the present embodiment, the handheld electronic communication device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The handheld electronic communication device 100 also includes an operating system 146 and software components 148 that are executed by the processor 102 and are typically stored in a persistent store such as flash memory 110. Additional applications may be loaded onto the handheld electronic communication device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the handheld electronic communication device 100 is similar. The speaker 128 outputs audible information converted from electrical signals, and the microphone 130 converts audible information into electrical signals for processing.

In one example, the operating system 146, software components 148 or a combination thereof implement a context aware notification process which monitors for and detects predetermined events. Upon the detection of a predetermined event, the processor may be configured to provide visual notification to a user as described herein. In at least some examples, the types of predetermined events that trigger a visual notification can be configured by a user of the mobile electronic device 202.

Predetermined events may occur in connection with various operational functions of the handheld electronic device 100. For example, a predetermined event can be the receipt of a message such as an e-mail, a text message, a multimedia message or an instant messaging message. A predetermined event may also occur when the device 100 is receiving an incoming voice call, when an incoming call was not answered commonly referred to as a missed call, or when a voicemail has been left on the device 100 or on a mobile network associated with the device 100. A predetermined event may also include calendar reminders or alarms; or changes to the state of the battery 144 such as when the battery is low, charging or full.

A predetermined event may also include changes to the connection status of the device 100 such as when the device 100 is roaming or when there are Wi-Fi networks available for connection. Other predetermined events may occur within any other hardware or software component or any combination thereof, and are not limited to the examples provided above.

Referring to FIGS. 2, 3, 4A-4D and 5A-5D views of an example of the handheld electronic communications device 100 are shown. The handheld electronic communication device 100 includes a housing 200 having a longitudinal axis and a sliding display screen assembly 202 that is mounted to the housing to slide axially between a retracted position as shown in FIGS. 2 and 4A-4D and an extended position as shown in FIGS. 3 and 5A-5D. The housing 200 includes a base 210 and a keyboard support member 224 in which a plurality of forward facing user input keys 216 of the keyboard 120 are disposed. A cavity 218, as best seen in sectional view of FIG. 10, and indicated by dashed reference line in FIGS. 2 and 3, is defined between a front surface of the base 210 and a back surface of the keyboard support member 224. The sliding display assembly 202 includes a display screen 204 (which in one example includes display 112 and touch sensitive overlay 114) on its front face. The display screen 204 has a first or lower portion 220 and a second or upper portion 222. When the display assembly 202 is in the retracted position as shown in FIG. 2, the lower portion 220 of the display screen 204 is received within the cavity 218 of housing 200 underlying the keyboard support member 224 such that the lower portion 220 is hidden from view, and the upper portion 222 of the display screen 204 extends from an open end of the cavity 218 and is exposed and viewable from a front of the device. When the display assembly 202 is in the extended position as shown in FIG. 3, the lower portion 220 of the display assembly is positioned out of the cavity 218 such that both the lower portion 220 and the upper portion 222 of the display screen 204 are viewable.

The sliding display assembly 202 may in at least some examples enable a compact size for the handheld electronic communication device 100 when the display assembly is retracted while providing a larger viewable display screen area when the display assembly is extended. The keyboard 120 is exposed and fully accessible from a front of the handheld electronic communication device 100 when the display assembly 202 is in both the retracted and extended positions.

Figures 6A, 6B, 6C:
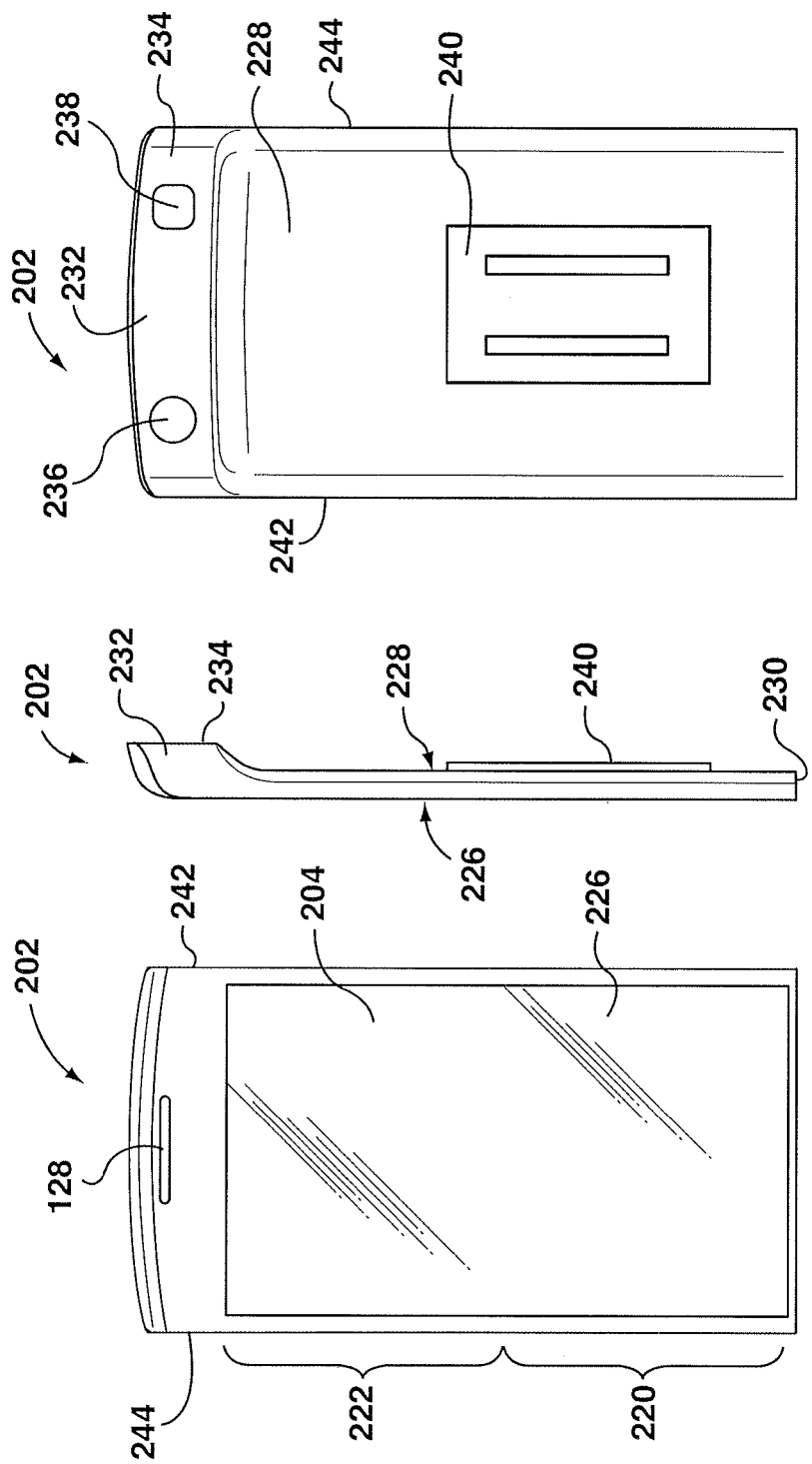
FIG. 6A is a front view of a display assembly of the handheld electronic communication device of FIG. 2.
FIG. 6B is a back view of the display assembly of FIG. 6A.
FIG. 6C is a side view of the display assembly of FIG. 6A.

The housing 200 and the display assembly 202 may both house components of the handheld electronic communication device 100, including the components described and shown in FIG. 1. Referring to FIGS. 6A-6C, an example of the display assembly 202 will now be explained in greater detail. The display assembly 202 has a first or lower terminal end 230 that is received within the housing cavity 218 at least when the display assembly 202 is in the retracted position, and a second or upper terminal end 232 at its opposite end. The display assembly 202 has a substantially planar front face 226 which includes a viewable surface of the display screen 204, an opposite facing back face 228 and longitudinal side edges 242 and 244. The back face 228 is substantially planar over most of the length of the display assembly 202, however the upper terminal end 232 defines an enlarged boss portion 234 that has a back face that is spaced further back from the display assembly front face 226 than the rest of the back face 228. In one example, the enlarged boss portion 234 houses an optical sensor 236 that faces outward from the back face of the display assembly 202 for capturing one or both of photo or video image data. A flash or illuminator 238 may also be housed in the enlarged boss portion 234 for illuminating objects that are the subject of image capture by the optical sensor 236.

As can be seen in the retracted position back view of FIG. 4B and the extended position back view of FIG. 5B, in at least some examples the optical sensor 236 and illuminator 238 are concealed by the housing 200 when the display assembly 202 is in its retracted position, but are exposed when the display assembly 202 is in its extended position.

Referring again to FIGS. 6A to 6C, in the illustrated example, device speaker 128 is housed in the enlarged boss portion 234 at the upper end 232 of the display assembly 202, and is oriented to output sound from the upper end 232 of the front face 226. In some examples, a sliding assembly member 240 is provided on the back face 228 of the display assembly 202 for slidably mounting the display assembly to a front face of the housing base 210.

Referring to FIGS. 7-9, an example of the housing 200 will now be explained in greater detail. As noted above, the housing 200 includes a base 210 and a keyboard support member 224. In one example, the keyboard support member 224 is part of a front housing unit 208. As shown in FIGS. 7 and 9, base 210 has substantially planar front face 252 with a first or lower section 246 and a second or upper section 248. The front face of the base lower section 246 is arranged in spaced opposition to the keyboard support member 224 to form cavity 218, and the base upper section 248 extends from the first section 246 beyond the open end of the cavity 218. The front face of upper section 248 faces the back face 228 of the display assembly 202. In some examples of handheld communication device 100, many of the components of the device shown in FIG. 1 are located within the base 210 including for example the main processor 102, RAM 108, memory 110, and communication subsystems 104 and 132. In one example, microphone 130 is located at a lower end of the base as illustrated in FIG. 9. An opening or slot 250 (see FIG. 8) may be provided in a lower end of the front housing unit 208 in alignment with the microphone 130. One or more antennas of one or both of the communications subsystem 104 and 132 may also be positioned at or near the lower end of the base 210. In some example embodiments, one or more data ports 126 and auxiliary I/O interfaces 124 can be provided on side edges of the base 210. For example, as seen in FIG. 4D, a data port 126 in the form of a USB port and an I/O interface 124 in the form of an audio/microphone jack are provided on a side edge of the upper section of base 210. As seen in FIG. 4C, physical user input buttons such as volume control buttons 253 that are operatively connected to the processor 102 can also be located on side edges of the base 210.

Referring again to FIG. 9, a slider assembly member 254 can be provided on the front face 252 of the base 210. The slider assembly member 254 of the base 210 cooperates with the slider assembly member 240 of the sliding display assembly 202 to collectively provide a sliding assembly 256 (FIG. 10) that slidably connects the display assembly 202 to the base 210. Any different number of known sliding assembly configurations could be used to implement sliding assembly 256, including but not limited to slider assemblies that incorporate one or both of springs and or electric motors to assist in moving the sliding component and retaining the sliding component in a desired position. In at least some examples a flex connector 260 extends between the base 210 and the sliding assembly 256 to provide an electrical link between components housed within the display assembly 202 and components housed within the base 210. In some example configurations, other communications links could be provided between base components and display assembly components, including for example optical or RF links.

One or more position sensors 258 can be provided on the base 210 or the display assembly 202 for detecting the position of the display assembly 202 relative to the housing 200. For example, a Hall effect sensor may be utilized to detect a position or positions of the display assembly 202 relative to the housing 200. According to another example, a mechanical switch or switches are used.

With reference to FIGS. 7 and 8, the keyboard support member 224 forms a lower portion of front housing unit 208 and supports keyboard 120. In one example, keyboard 120 includes a plurality of depressible alphanumeric keys 216 which may be arranged in rows and columns with a standard keyboard layout (e.g. QWERT, DVORAK, etc.). In some examples, the keyboard 120 may include a respective dome switch associated with each of the keys 216, however many different keyboard configurations could be used to implement keyboard 120.

In one example embodiment, a number of function keys 282 and a navigation device 122 are provided in a row along on the keyboard support member 120 between the keyboard 120 and the display screen. Function keys 282 are operatively connected to the processor 102 to initiate predetermined device functions such as initiate a phone call, terminate a phone call, and return to previous screen, among other things. The navigation device 122 responds to user interaction and can be used for navigating around the display screen 204, to select objects on the display screen 204 and for other purposes. The navigation device 122 can act as a cursor navigational tool and in some examples, the navigation device 122 can consist of an optically based user input device such as an optical joystick that uses an optical sensor pad 206 to detect relative movements of a finger. The optically based navigation device 122 can be used to instruct two-dimensional screen cursor movement in substantially any direction, as well as act as an actuator when the optically based navigation device 122 is depressed like a button. In some examples, where an optical sensor pad is used to implement navigation device 122, the optical sensor pad has a low profile so that it is generally flush with the front of the keyboard support member 224 and does not protrude extensively behind the keyboard support member. In some examples, navigation device 122 could alternatively be a trackball, touchpad, physical joystick, directional keys or key pad.

In an example, the front housing unit 208 includes opposed first and second sidewalls 264 and 266 that extend from the keyboard support member 224 along respective axial side edges of the upper section 248 of base 210. At the upper end of the housing unit, the sidewalls 264 and 266 are connected by a cross member 278. The cross member 278, sidewalls 264 and 266 and keyboard support member 224 collectively define a rectangular opening 280 through which the display assembly 202 can be viewed. Referring to the sectional view of FIG. 11, in one example sidewalls 264 and 266 each protrude away from the front face 252 of base 210 so that the screen assembly 202 is located between the sidewalls 264 and 266. As can be seen in FIG. 4A, when the screen assembly 202 is in its retracted position, the upper portion 222 of the display screen 204 is located between sidewalls 264 and 266 with the side edges of the screen assembly 202 concealed by sidewalls 264 and 266. In the extended position, as seen in FIG. 5A, at least part of the upper portion 222 of the display screen extends beyond the upper ends of the sidewalls 264.

Referring again to the sectional view of FIG. 11, in one example, an outer surface of the sidewall 266 together with an outer side edge surface 281 of the base 210 forms one side edge of the communication device 100 and an outer surface of the sidewall 264 together with an outer side edge surface 284 of the base 210 forms an opposite side edge of the communication device 100. In one example, along the sides of rectangular opening 280 (FIG. 8) the terminal edges 286, 288 of the sidewalls 264, 266 that face away from the front surface 252 of the base 210 are located in plane that is slightly higher than a front viewing surface of the display screen 204. In another example, along the sides of rectangular opening 280 the terminal edges 286, 288 of the sidewalls 264, 266 that face away from the front surface 252 of the base 210 are located in plane that is substantially flush with a front viewing surface of the display screen 204.

Referring again to FIGS. 7, 8 and 10, in one example the cross member 278 that extends between the upper ends of the sidewalls 264, 266 is offset back towards the base 210 relative to the sidewalls 264, 266 such that the cross member 278 is located behind the back face of the enlarged boss portion 234 of the upper end 232 of the display assembly 202. In such an example, the cross member 278 forms the upper terminal end of the housing 200 and provides a recess in the housing 200 for receiving the enlarged display assembly boss portion 234 when the display assembly is in its retracted position, and conceals the optical sensor 236 and illuminator 238 that are located the back face of the enlarged boss portion 234. As seen in FIGS. 4C and 4B, when the display assembly 202 is in its retracted position its upper end 232 is coterminous with the upper end of the housing 200 such that the housing 200 covers substantially the entire back surface of the display assembly 202.

In one example, the sidewalls 264, 268 protect the side edges of the display assembly 202 when the display assembly is in its retracted position, and also provide opposed surfaces for gripping the handheld electronic communication device 100 between the palm and fingers of a hand without interfering with movement of the display assembly. In one embodiment the sidewalls 264, 268 are respectively spaced apart such that a user can grip one side edge of the communication device 100 with fingers of a hand, grip the opposite side edge with the palm of the same hand and have the thumb free to either extend or retract the display assembly 202 or actuate the navigation device 122.

As indicated above the communication device 100 may include one or more sensors 258 that indicate one or more relative positions of the display assembly 200 to the processor 102. In examples the processor 102 is configured to modify operational characteristics of the display screen 204 in dependence on the sensed position of display assembly 200. By way of example, where the display screen 204 is an OLED (organic light emitting diode) display having pixels that can be selectively illuminated, when the processor 102 detects that the display assembly 204 is retracted the processor 102 can disable the illumination of pixels that are in the portion of the display screen 204 that is received within recess 218, while still enabling illumination the pixels of upper display screen portion 222. Such a feature may allow power conservation.

Figure 14:
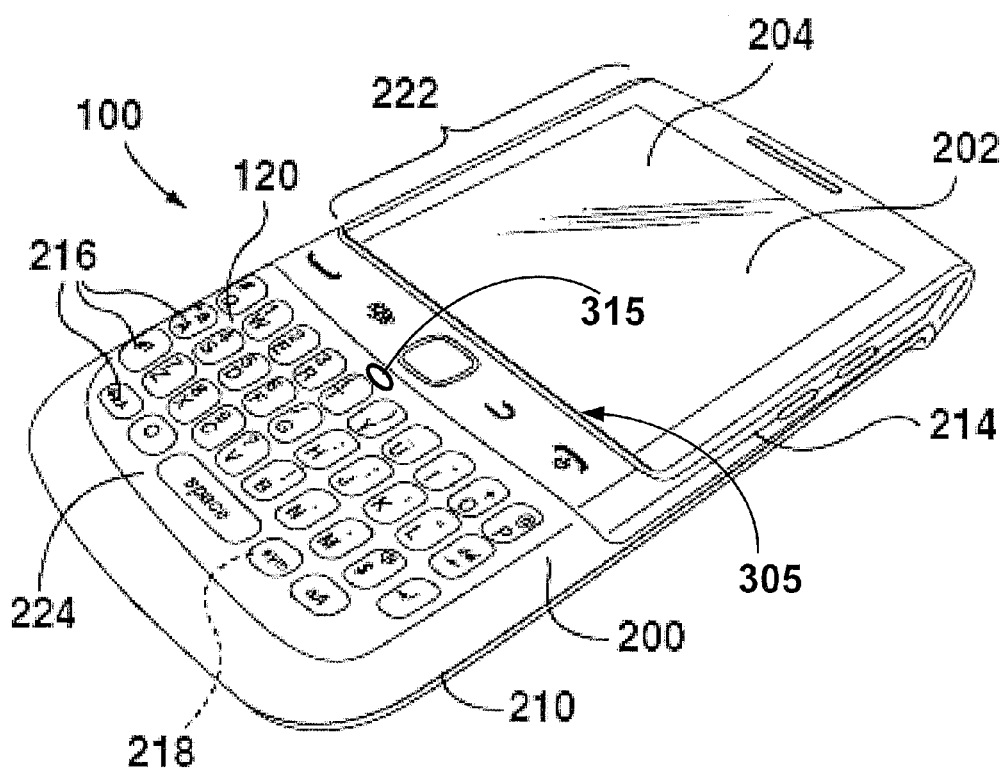
FIG. 14 is a front view of an example of a handheld electronic communication device including a display assembly in a retracted position.

Referring to FIG. 14, in some examples, the display assembly 202 and the housing 200 form one or more gaps 305 through which light generated from within the cavity 218 by pixels on the lower portion 220 of the display screen 204 can emit from the cavity and can be visible to a user.

In some examples, the inner surfaces of the sidewalls 264, 266, the front face of the base 252, the back surface of the keyboard support member 224, the surfaces defining the rectangular opening 280, the longitudinal side edges 242, 244, or any portion or combination thereof may comprise reflective or transmissive material to help direct light generated from within the cavity 218 by pixels on the lower portion 220 of the display to be visible outside of the cavity.

In some examples, the front housing unit 208 has one or more bores or translucent channels 315 through which light generated from within the cavity 218 by pixels on the lower portion 220 of the display can emit. While the bore or translucent channel 315 in FIG. 14 is illustrated in the middle of the device 100, the bores or translucent channels can be located anywhere in the front housing unit 208 such that they permit light generated within the cavity 218 to be emitted from the device 100.

In some examples, the user input keys 216, the navigation device 122, the function keys 282, or any combination thereof may be formed from translucent material or comprise one or more translucent channels through which light generated within the cavity 218 to be emitted from the front face of the device 100. In these examples, the lower portion 220 of the display can be used as a backlight for one or more of these devices or keys.

Figure 15:
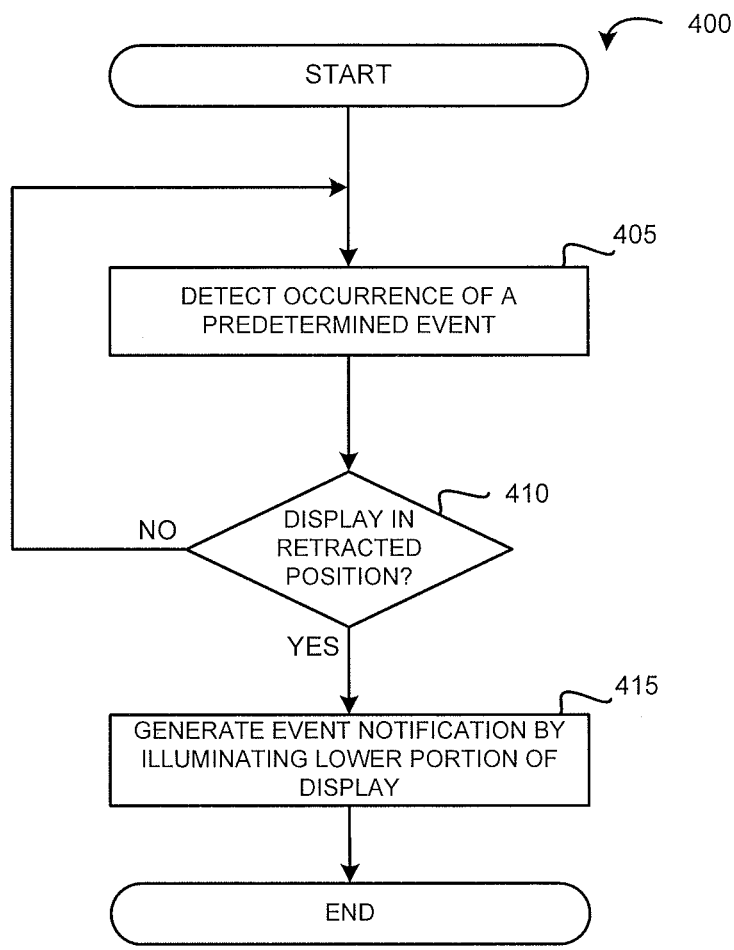
FIGS. 15-17 are flowcharts illustrating different examples of methods of generating event notifications on a handheld electronic device with a sliding display.

Referring to FIG. 15, a method of generating event notifications is illustrated 400. In step 405, the processor is configured to detect the occurrence of a predetermined event. In one example, a predetermined event or a subsystem on which a predetermined event has occurred can trigger an interrupt sequence. In another example, the processor may poll a number of software modules, hardware components or memory registers to detect the occurrence of a predetermined event. As noted above, predetermined events may for example include, among other things event such as the following occurring at the mobile electronic device 100: the receipt of a message such as an e-mail, a text message, a multimedia message or an instant messaging message; receiving an incoming voice call; notification of an unanswered call received at the device 100; notification of a new voicemail; calendar reminders or alarms; changes to the state of the battery 144 such as when the battery is low, charging or full; and changes to the connection status of the device 100 such as when the device 100 is roaming or when there are Wi-Fi networks available for connection. In some example embodiments, the predetermined events that will be detected in step 405 can be configured by an administrator or a user of the device.

Upon detection of a predetermined event, if, in step 410, the one or more position sensors 258 indicate that the display is in the retracted position, the processor is configured in step 415 to generate an event notification by illuminating pixels in the lower portion 220 of the display screen 204. These illuminated pixels generate light which emits from the cavity to be viewable from a front of the mobile electronic device 100 via one or more means such as, for example, gaps 305, transmissive materials (for example translucent keys 216), bores or translucent channels 315 in the device.

In one example, the pixels in the retracted lower portion 220 of the display screen 204 are un-illuminated prior to the detection of a predetermined event, and after the event is detected the event notification is generated by illuminating some or all of the pixels in the lower portion 220 of the display screen 204, without affecting the existing display state of the upper portion 222 of the display screen 204, to create a visual notification within the cavity that is visible from a front of the mobile electronic device 100. For example, some or all of the pixels in the lower portion of the display could be illuminated to create a constant light source in the cavity. The pixels can be illuminated as a single colour or a combination of colours.

In another example, an event notification is generated by illuminating the pixels in the lower portion of the display screen 204 in a sequence. For example, the pixels may be illuminated and subsequently deluminated from the left side of the display screen 204 to the right side of the display screen 204 to create a wavelike effect. Any sequence of illumination and/or delumination in any combination of colours or patterns may be used to generate the event notification. The pixels may also be illuminated at different degrees of brightness or illumination to create sequences or patterns.

In another example, an event notification is generated by quickly and repeatedly illuminating and deluminating the pixels in the lower portion of the display screen 204 to create a flashing effect. The pixels may also be illuminated and deluminated in a duty cycle to create a pulsing effect. In some example embodiments, the pixels may be illuminated with alternating colours such as for example, repeating alternating flashes of white light and then red light.

In some example embodiments, the event notification generated in step 415 can be dependent on the type of predetermined event such that different events are uniquely associated with and identified by different types of visual notifications being generated in the retracted portion of the display screen 204. For example, an incoming phone call may result in high rate illumination and delumination of the pixels in the lower portion of the display screen 204, and an incoming email message a lower rate illumination and delumination of the pixels in the lower portion. Similarly, different groups of pixels could be illuminated to identify different types of events, different sequences of pixels could be illuminated to identify different types of events, and colors could be used to identify different types of events, or combinations of the forgoing. In example embodiments, the type of visual notification that is associated with a particular type of predetermined event can be configured through a setup application on the handheld electronic device.

Figure 16:
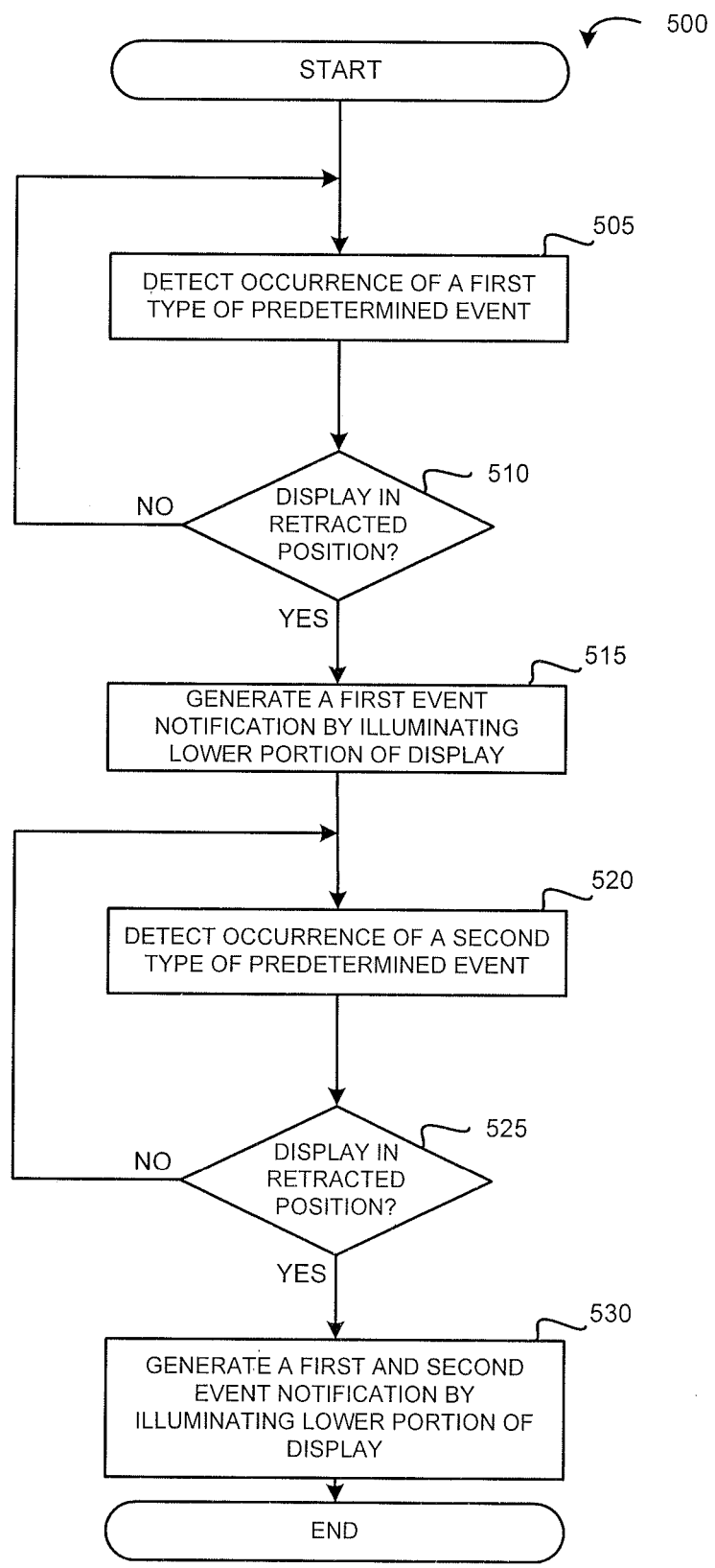

As indicated above, in at least some example embodiments, the pixels in the lower portion 220 of the display screen 204 are selectively activated independently of the pixels in exposed upper portion 222 to generate the event notification. The exposed upper portion 222 may also be used in generating an event notification, for example readable text information or a user discernable symbol that coveys information about the detected event (for example "call from John Smith") may be generated on the upper portion 222 at the same time that pixels are illuminated in the lower portion 220 to notify of the event. The flowchart in FIG. 16 illustrates another example method 500 that may be used to uniquely visually identify different types of predetermined events. Steps 505, 510 and 515 are the same as 405, 410 and 415 respectively. When a first type of predetermined event is detected and when the display screen 204 is in the retracted position, the processor generates an event notification by illuminating pixels in the lower portion 220 of the display screen 204. Subsequently, in step 520, if an occurrence of a second type of predetermined event is detected, and the position sensors indicate that the display is in the retracted position 525, the processor is configured in step 530 to generate two distinct event notifications by illuminating the pixels in the lower portion of the display.

For example, the processor may be configured to create a red flash when a text message is received and a green flash when an email message is received. In this scenario, if a text message is received and detected in step 505 and the display screen 204 is retracted, the processor will illuminate and deluminate the pixels in the lower portion of the display to create red flashes in step 515. If the processor subsequently detects receipt of an email message in step 520 and the display is retracted, the processor will illuminate and deluminate the pixels in the lower portion of the display screen 204 to create alternating red flashes and green flashes thereby generating notifications that indicate both a text message and an email message have been received. The processor can be configured to create any combination of colours, sequences or effects to generate any number of distinct notifications for different types of predetermined events.

Figure 17:
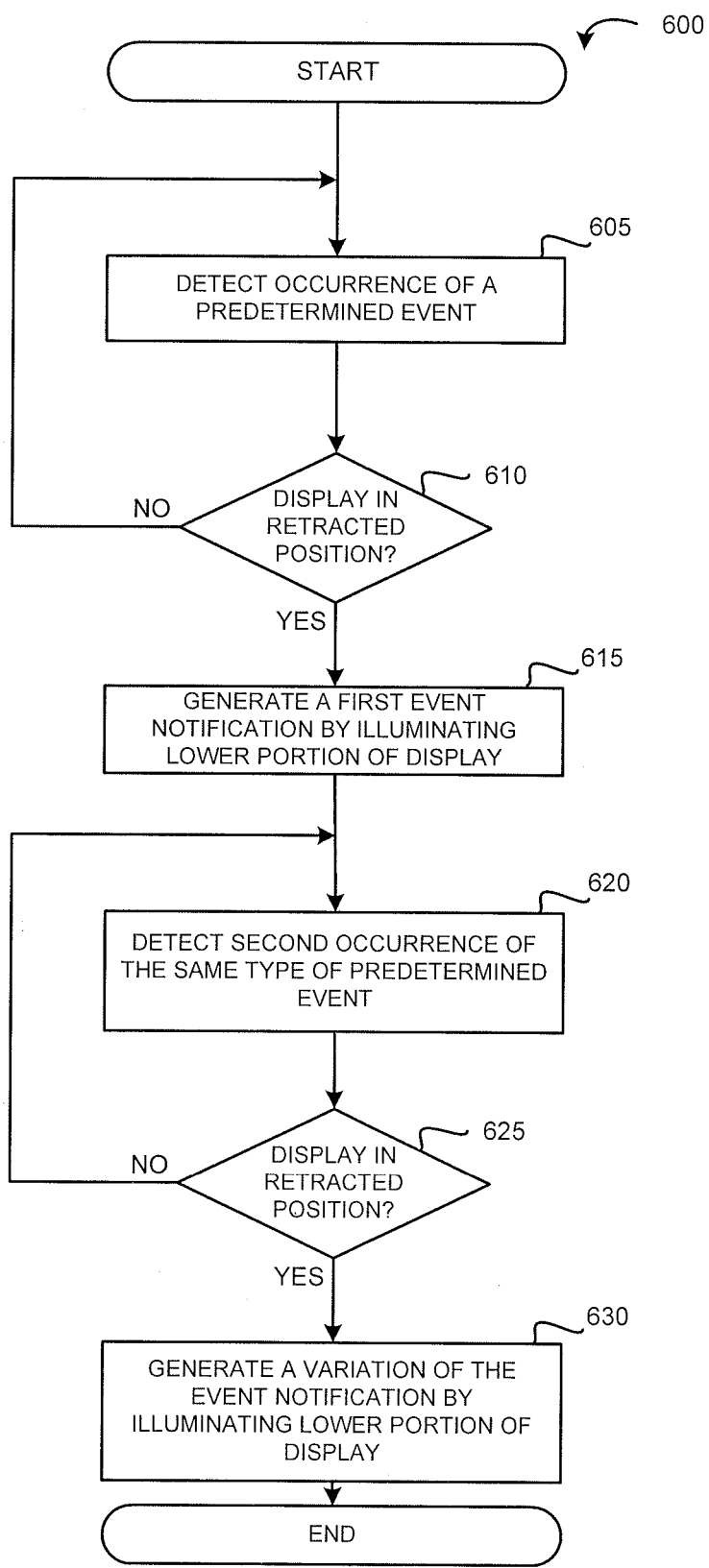

The flowchart in FIG. 17 illustrates another example method 600. The steps of method 600 are similar to those of method 500, except in step 620, a second occurrence of the same type of predetermined event detected in step 605 is detected. Upon detection of the second occurrence 620 and if the position sensors indicate that the display screen 204 is retracted 625, the processor is configured to generate a variation 630 of the first event notification generated in step 615.

For example, if in step 615 the processor is configured to create a red flash when a text message is received, when a second text message is received, the processor may be configured to create red flashes at a higher frequency in step 630. In other examples, if the processor is configured to create red pulses when a text message is received, when a second text message is received, the processor may cause the pixels in the lower portion of the display screen 204 to pulse with a longer duty cycle or with a brighter degree of illumination.

In another example, methods 500 and 600 may be combined. For example, the processor may be configured to create a red flash when a text message is received and a green flash when an email message is received. If two text messages and three emails are received, the processor may illuminate the pixels in the lower portion of the display screen 204 such that they flash in a sequence of two red flashes and three green flashes.

In some examples, the event notifications generated by the processor may be cleared when a user acknowledges or cancels the notification. A user acknowledgement or cancellation may be one of any number of user activities including pressing a key, opening an appropriate application or moving the display assembly to the extended position. In some example embodiments, pulsing or flashing of the lower portion of the display screen to generate event notifications only occurs when the display screen is in its retracted position, and when the display screen is in its extended position the event notification takes the form of a dialog box or pulsing or flashing of the entire display screen. In some example embodiments, when the display screen is in the retracted position and an event notification is generated, the lower portion of the display screen pulses or flashes while at the same time a dialog box presenting text or graphic information about the event notification is presented in the upper portion of the display screen. For example the dialog box could include information such as "Incoming Call from John Smith" or "Meeting Reminder" as the case may be.

In some example embodiments, when the display screen 204 is in its retracted position, user activation of a predetermined user input (for example a predetermined icon on the upper exposed portion 222 of the display screen 204) can cause the pixels in the retracted lower portion 220 to illuminate to provide backlighting so that keys 216 can be seen in low-light conditions. For example, if keys 216 were formed from translucent material, illuminating the lower portion 220 of the display screen could backlight the keys.

FIG. 12 illustrates a back view of another example of a handheld electronic communication device 100' that is substantially identical to handheld electronic communication device 100 except the back of housing 200 defines an opening 290 that exposes optical sensor 236 and illuminator 238 when display assembly 202 is in its retracted position. The opening 290, which for example could be provided by omitting all or a portion of the cross member 278, facilitates the taking of picture and video when the display assembly 202 is in the retracted position.

Figure 13:
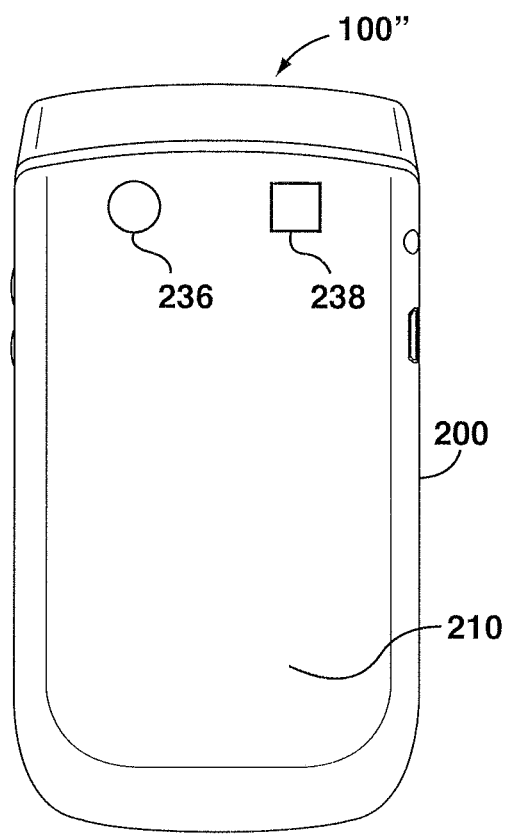
FIG. 13 is a back view of a further example of a handheld electronic communication device, showing the display assembly in the retracted position.

FIG. 13 illustrates a back view of another example of a handheld electronic communication device 100" that is substantially identical to handheld electronic communication device 100 except that the image sensor 236 and illuminator 238 are located on the back of housing 200 rather than the sliding display assembly 202. In such a configuration, the image sensor 236 and illuminator 238 are exposed regardless of the position of the display assembly.

While the present disclosure is described primarily in terms of methods, the present disclosure is also directed to a portable electronic device configured to perform at least part of the methods. The portable electronic device may be configured using hardware modules, software modules, a combination of hardware and software modules, or any other suitable manner. The present disclosure is also directed to a pre-recorded storage device or computer-readable medium having computer-readable code stored thereon, the computer-readable code being executable by at least one processor of the portable electronic device for performing at least parts of the described methods.

While the embodiments described herein are directed to particular implementations of the handheld electronic communication device, it will be understood that modifications and variations may occur to those skilled in the art. All such modifications and variations are believed to be within the sphere and scope of the present disclosure.

What is claimed is:

1. A handheld electronic device comprising:
a housing comprising a keyboard support member on a front thereof and a base defining a cavity therebetween;
a display assembly slidably mounted to the housing and comprising a display screen on a front face thereof, the display assembly being slidable between a retracted position and an extended position, wherein in the retracted position a lower portion of the display screen is received within the cavity underlying the keyboard support member and an upper portion of the display screen is viewable outside of the cavity, and in the extended position the lower portion and the upper portion of the display screen are viewable outside of the cavity, wherein the display screen is a light emitting diode display screen comprising a plurality of pixels that are selectively illuminatable to display an image, wherein the housing allows at least some light generated by illumination of the pixels in the lower portion to be viewed from a front of the housing when the lower portion is received within the cavity;
a processor configured to control operation of the display screen; and
a position sensor for indicating to the processor when the display assembly is in the retracted position;
the processor being configured to, when the position sensor indicates the display assembly is in the retracted position, upon an occurrence of one or more predetermined events, generate an event notification by illuminating pixels in the lower portion of the display screen.

2. The handheld electronic device of claim 1 wherein the one or more predetermined events comprise one of receipt of a new message, an incoming phone call, or a calendar event.

3. The handheld electronic device of claim 1 wherein the processor is configured to generate the event notification by illuminating and deluminating pixels in the lower portion of the display screen in a pulsing or flashing pattern.

4. The handheld electronic device of claim 1 wherein the processor is configured to generate distinct event notifications for different types of predetermined event.

5. The handheld electronic device of claim 4 wherein the processor is configured to generate the distinct event notifications by illuminating the pixels in the lower portion of the display screen to display different colours, to illuminate in different patterns, to pulse or flash at different rates, or any combination of thereof.

6. The handheld electronic device of claim 1 wherein when at least two occurrences of a single type of predetermined event have occurred, the processor is configured to illuminate the pixels in the lower portion of the display screen with a flashing frequency or a degree of illumination that is different than when a single occurrence of an event has occurred.

7. The handheld electronic device of claim 1 wherein when the display assembly is in the retracted position, the housing and the display screen form a gap through which light generated within the cavity can emit.

8. The handheld electronic device of claim 1 wherein the keyboard support member supports a plurality of physical keys through which light generated in the cavity can emit.

9. The handheld electronic device of claim 8 wherein the physical keys are formed from translucent material.

10. The handheld electronic device of claim 1 wherein the housing further comprises one or more bores or translucent channels through which light generated within the cavity can emit.

11. The handheld electronic device of claim 1 further comprising keys or navigation devices with translucent channels through which light generated within the cavity can emit.

12. The handheld electronic device of claim 1 wherein a portion of an inner surface of the housing defining the cavity comprises a reflective material to increase the amount of light generated within the cavity that is emitted from the cavity.

13. A method of generating event notifications on a handheld electronic device with a sliding display, the sliding display being slidable between a retracted position and an extended position, wherein in the retracted position a lower portion of the display is received within a cavity in the handheld electronic device and an upper portion of the display is viewable outside of the cavity, and in the extended position the lower portion and the upper portion of the display are viewable outside of the cavity, the method comprising:

detecting an occurrence of one or more predetermined events; and when the display is in the retracted position, and upon detecting the occurrence of the one or more predetermined events, generating an event notification by illuminating pixels in the lower portion of the display.

14. The method of claim 13 wherein detecting the occurrence of the one or more predetermined events comprises detecting a new message, an incoming phone call, or a calendar event.

15. The method of claim 13 wherein generating the event notification comprises illuminating and deluminating pixels in the lower portion of the display screen in a pulsing or flashing pattern.

16. The method of claim 13 further comprising generating distinct event notifications for each type of detected predetermined event.

17. The method of claim 16 wherein generating the distinct event notifications comprises illuminating the pixels in the lower portion of the display screen in different colours, in different patterns, in pulses or flashes at different rates, or in any combination of thereof.

18. The method of claim 13 wherein illuminating the pixels in the lower portion of the display screen causes light to be emitted from a bore, a translucent channel or transmissive material on the handheld electronic device.

19. The method of claim 13 further comprising upon detecting a second occurrence of a single type of predetermined event, generating an event notification by illuminating the pixels in the lower portion of the display screen with a flashing frequency or a degree of illumination that is different than when a single occurrence of an event had occurred.

20. A computer program product comprising a non-transitory computer readable medium storing instructions enabling a processor on a handheld electronic device to carry out the method of claim 13.

\* \* \* \* \*